US008932996B2

(12) United States Patent
Falana et al.

(10) Patent No.: US 8,932,996 B2
(45) Date of Patent: Jan. 13, 2015

(54) GAS HYDRATE INHIBITORS AND METHODS FOR MAKING AND USING SAME

(75) Inventors: Olusegun Matthew Falana, San Antonio, TX (US); Michael Morrow, Larkspur, CO (US); Frank G. Zamora, San Antonio, TX (US)

(73) Assignee: Clearwater International L.L.C., Houston, TX (US)

( * ) Notice: Subject to any disclaimer, the term of this patent is extended or adjusted under 35 U.S.C. 154(b) by 47 days.

(21) Appl. No.: 13/348,279

(22) Filed: Jan. 11, 2012

(65) Prior Publication Data

US 2013/0178399 A1     Jul. 11, 2013

(51) Int. Cl.
    *C04B 7/42*     (2006.01)
    *C09K 8/528*     (2006.01)

(52) U.S. Cl.
    USPC ............................................ 507/128; 507/274

(58) Field of Classification Search
    CPC ............ C09K 8/22; C09K 8/36; C09K 8/035
    USPC ................................................. 507/128, 274
    See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |

(Continued)

FOREIGN PATENT DOCUMENTS

WO    WO 2009/141308    * 11/2009        C09K 8/06

OTHER PUBLICATIONS

U.S. Appl. No. 13/117,304, filed May 27, 2011, Falana et al.
U.S. Appl. No. 13/247,985, filed Sep. 28, 2011, Veldman et al.

(Continued)

*Primary Examiner* — Susannah Chung
*Assistant Examiner* — Atnaf Admasu
(74) *Attorney, Agent, or Firm* — Robert W. Strozier

(57) ABSTRACT

Methods relate to using phosphate and/or nitrate brines to reduce hydrate formation in flowlines under conditions conducive for hydrate formation in the absence of the phosphate and/or nitrate brine. The phosphate and/or nitrate brines may include compatible anti-corrosion additives.

20 Claims, 7 Drawing Sheets

(56) References Cited

U.S. PATENT DOCUMENTS

| | | | | |
|---|---|---|---|---|
| 5,347,004 | A | 9/1994 | Rivers et al. | 544/180 |
| 5,363,919 | A | 11/1994 | Jennings, Jr. | 166/308.1 |
| 5,402,846 | A | 4/1995 | Jennings, Jr. et al. | 166/259 |
| 5,411,091 | A | 5/1995 | Jennings, Jr. | 166/308.1 |
| 5,424,284 | A | 6/1995 | Patel et al. | 507/129 |
| 5,439,055 | A | 8/1995 | Card et al. | 166/280.2 |
| 5,462,721 | A | 10/1995 | Pounds et al. | 423/226 |
| 5,465,792 | A | 11/1995 | Dawson et al. | 166/295 |
| 5,472,049 | A | 12/1995 | Chaffe et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308.1 |
| 5,501,275 | A | 3/1996 | Card et al. | 166/280.2 |
| 5,551,516 | A | 9/1996 | Norman et al. | 166/308.2 |
| 5,624,886 | A | 4/1997 | Dawson et al. | 507/217 |
| 5,635,458 | A | 6/1997 | Lee et al. | 507/240 |
| 5,649,596 | A | 7/1997 | Jones et al. | 166/300 |
| 5,669,447 | A | 9/1997 | Walker et al. | 166/300 |
| 5,674,377 | A | 10/1997 | Sullivan, III et al. | 208/208 R |
| 5,688,478 | A | 11/1997 | Pounds et al. | 423/228 |
| 5,693,837 | A | 12/1997 | Smith et al. | 556/148 |
| 5,711,396 | A | 1/1998 | Joerg et al. | 180/444 |
| 5,722,490 | A | 3/1998 | Ebinger | 166/281 |
| 5,744,024 | A | 4/1998 | Sullivan, III et al. | 208/236 |
| 5,755,286 | A | 5/1998 | Ebinger | 166/281 |
| 5,775,425 | A | 7/1998 | Weaver et al. | 166/276 |
| 5,787,986 | A | 8/1998 | Weaver et al. | 166/280.2 |
| 5,806,597 | A | 9/1998 | Tjon-Joe-Pin et al. | 166/300 |
| 5,807,812 | A | 9/1998 | Smith et al. | 507/238 |
| 5,833,000 | A | 11/1998 | Weaver et al. | 166/276 |
| 5,853,048 | A | 12/1998 | Weaver et al. | 166/279 |
| 5,871,049 | A | 2/1999 | Weaver et al. | 166/276 |
| 5,877,127 | A | 3/1999 | Card et al. | 507/273 |
| 5,908,073 | A | 6/1999 | Nguyen et al. | 166/276 |
| 5,908,814 | A | 6/1999 | Patel et al. | 507/131 |
| 5,964,295 | A | 10/1999 | Brown et al. | 166/308.2 |
| 5,979,557 | A | 11/1999 | Card et al. | 166/300 |
| 5,980,845 | A | 11/1999 | Cherry | 423/229 |
| 6,016,871 | A | 1/2000 | Burts, Jr. | 166/300 |
| 6,035,936 | A | 3/2000 | Whalen | 166/308.5 |
| 6,047,772 | A | 4/2000 | Weaver et al. | 166/276 |
| 6,054,417 | A | 4/2000 | Graham et al. | 507/238 |
| 6,059,034 | A | 5/2000 | Rickards et al. | 166/280.2 |
| 6,060,436 | A | 5/2000 | Snyder et al. | 507/266 |
| 6,063,972 | A * | 5/2000 | Duncum et al. | 585/15 |
| 6,069,118 | A | 5/2000 | Hinkel et al. | 507/277 |
| 6,123,394 | A | 9/2000 | Jeffrey | 299/16 |
| 6,133,205 | A | 10/2000 | Jones | 507/276 |
| 6,147,034 | A | 11/2000 | Jones et al. | 507/238 |
| 6,162,449 | A | 12/2000 | Maier et al. | 424/401 |
| 6,162,766 | A | 12/2000 | Muir et al. | 507/267 |
| 6,169,058 | B1 | 1/2001 | Le et al. | 507/222 |
| 6,228,812 | B1 | 5/2001 | Dawson et al. | 507/221 |
| 6,247,543 | B1 | 6/2001 | Patel et al. | 175/64 |
| 6,267,938 | B1 | 7/2001 | Warrender et al. | 423/226 |
| 6,283,212 | B1 | 9/2001 | Hinkel et al. | 166/279 |
| 6,291,405 | B1 | 9/2001 | Lee et al. | 507/136 |
| 6,330,916 | B1 | 12/2001 | Rickards et al. | 166/280.2 |
| 6,725,931 | B2 | 4/2004 | Nguyen et al. | 166/280.2 |
| 6,756,345 | B2 | 6/2004 | Pakulski et al. | 507/246 |
| 6,793,018 | B2 | 9/2004 | Dawson et al. | 166/300 |
| 6,832,650 | B2 | 12/2004 | Nguyen et al. | 166/279 |
| 6,875,728 | B2 | 4/2005 | Gupta et al. | 507/240 |
| 7,055,628 | B2 * | 6/2006 | Grainger et al. | 175/66 |
| 7,140,433 | B2 | 11/2006 | Gatlin et al. | 166/250.1 |
| 7,186,353 | B2 * | 3/2007 | Novak | 252/70 |
| 7,268,100 | B2 | 9/2007 | Kippie et al. | 507/244 |
| 7,350,579 | B2 | 4/2008 | Gatlin et al. | 166/308.3 |
| 7,392,847 | B2 | 7/2008 | Gatlin et al. | 166/280.2 |
| 7,517,447 | B2 | 4/2009 | Gatlin | 208/236 |
| 7,565,933 | B2 | 7/2009 | Kippie et al. | 166/372 |
| 7,566,686 | B2 | 7/2009 | Kippie et al. | 507/213 |
| 7,712,535 | B2 | 5/2010 | Venditto et al. | 166/308.2 |
| 7,767,628 | B2 | 8/2010 | Kippie et al. | 507/102 |
| 7,829,510 | B2 | 11/2010 | Gatlin et al. | 507/277 |
| 7,886,824 | B2 | 2/2011 | Kakadjian et al. | 166/308.2 |
| 7,915,203 | B2 | 3/2011 | Falana et al. | 507/136 |
| 7,932,214 | B2 | 4/2011 | Zamora et al. | 507/202 |
| 7,942,201 | B2 | 5/2011 | Ekstrand et al. | 133/246 |
| 7,956,017 | B2 | 6/2011 | Gatlin et al. | 166/280.2 |
| 7,956,217 | B2 | 6/2011 | Falana et al. | 562/572 |
| 7,971,659 | B2 | 7/2011 | Gatlin et al. | 510/492 |
| 7,989,404 | B2 | 8/2011 | Kakadjian et al. | 507/261 |
| 7,992,653 | B2 | 8/2011 | Zamora et al. | 175/65 |
| 8,011,431 | B2 | 9/2011 | van Petegen | 166/270 |
| 8,012,913 | B2 | 9/2011 | Gatlin et al. | 507/239 |
| 8,028,755 | B2 | 10/2011 | Darnell et al. | 166/379 |
| 8,034,750 | B2 | 10/2011 | Thompson et al. | 507/273 |
| 8,065,905 | B2 | 11/2011 | Sweeney et al. | 73/49.1 |
| 8,084,401 | B2 | 12/2011 | Lukocs et al. | 507/238 |
| 8,093,431 | B2 | 1/2012 | Falana et al. | 564/471 |
| 8,097,567 | B2 | 1/2012 | Wilson, Jr. | 507/131 |
| 8,099,997 | B2 | 1/2012 | Curr et al. | 73/49.5 |
| 8,141,661 | B2 | 3/2012 | Kakadjian et al. | 175/69 |
| 8,158,562 | B2 | 4/2012 | Wilson, Jr. et al. | 507/203 |
| 8,172,952 | B2 | 5/2012 | Wanner et al. | 134/22.11 |
| 2002/0049256 | A1 | 4/2002 | Bergeron, Jr. | 514/674 |
| 2002/0165308 | A1 | 11/2002 | Kinniard et al. | 524/492 |
| 2003/0220204 | A1 | 11/2003 | Baran, Jr. et al. | 507/200 |
| 2005/0045330 | A1 | 3/2005 | Nguyen et al. | 166/281 |
| 2005/0092489 | A1 | 5/2005 | Welton et al. | 166/280.2 |
| 2005/0137114 | A1 | 6/2005 | Gatlin et al. | 510/424 |
| 2006/0194700 | A1 | 8/2006 | Gatlin et al. | 507/203 |
| 2008/0251252 | A1 | 10/2008 | Schwartz | 507/238 |
| 2008/0318812 | A1 | 12/2008 | Kakadjian et al. | 507/219 |
| 2009/0250659 | A1 | 10/2009 | Gatlin | 208/236 |
| 2009/0275488 | A1 | 11/2009 | Zamora et al. | 507/236 |
| 2010/0077938 | A1 | 4/2010 | Zamora et al. | 106/677 |
| 2010/0212905 | A1 | 8/2010 | van Petegen | 507/236 |
| 2010/0252262 | A1 | 10/2010 | Ekstrand et al. | 166/305.1 |
| 2010/0292108 | A1 | 11/2010 | Kakadjian | 507/229 |
| 2010/0305010 | A1 | 12/2010 | Falana et al. | 507/274 |
| 2010/0311620 | A1 | 12/2010 | Kakadjian et al. | 507/266 |
| 2011/0001083 | A1 | 1/2011 | Falana et al. | 252/178 |
| 2011/0005756 | A1 | 1/2011 | van Petegen | 507/236 |
| 2011/0240131 | A1 | 10/2011 | Parker | 137/13 |
| 2011/0247821 | A1 | 10/2011 | Thompson et al. | 507/267 |
| 2011/0284247 | A1 | 11/2011 | Zamora et al. | 166/295 |
| 2011/0284248 | A1 | 11/2011 | Zamora et al. | 166/295 |
| 2012/0071366 | A1 | 3/2012 | Falana et al. | 507/202 |
| 2012/0071367 | A1 | 3/2012 | Falana et al. | 507/203 |
| 2012/0071370 | A1 | 3/2012 | Falana et al. | 507/233 |
| 2012/0073813 | A1 | 3/2012 | Zamora et al. | 166/285 |
| 2012/0137752 | A1 | 6/2012 | Morrow | 73/49.5 |

OTHER PUBLICATIONS

U.S. Appl. No. 13/109,712, filed May 17, 2011, Falana et al.
U.S. Appl. No. 13/102,053, filed May 6, 2011, Falana et al.
U.S. Appl. No. 13/094,806, filed Apr. 26, 2011, Zamora et al.
U.S. Appl. No. 13/052,947, filed Mar. 21, 2011, Kakadjian et al.
U.S. Appl. No. 13/102,053, filed May 6, 2011, Kakadjian et al.
U.S. Appl. No. 13/348,267, filed Jan. 1, 2012, Kakadjian et al.
U.S. Appl. No. 13/249,819, filed Sep. 30, 2011, Falana et al.
U.S. Appl. No. 13/348,279, filed Jan. 11, 2012, Falana et al.
U.S. Appl. No. 13/348,267, filed Jan. 11, 2012, Kakadjian et al.

* cited by examiner

GAS HYDRATE INHIBITORS AND METHODS FOR MAKING AND USING SAME

BACKGROUND OF THE INVENTION

1. Field of the Invention

Embodiments of this invention relates to methods for using phosphate and/or nitrate brines to reduce hydrate formation in flowlines under conditions conducive for hydrate formation in the absence of the phosphate and/or nitrate brine. In certain embodiments, the phosphate and/or nitrate brines may include compatible anti-corrosion additives.

2. Description of the Related Art

Gas hydrate is a solid comprising a mixture of water and hydrocarbon gas such as methane. Such mixtures are predominantly water with occluded gaseous hydrocarbons such as methane, ethylene, propylene, etc., normally present in minor amounts. The hydrates may also include other gas components or gas contaminants such as carbon dioxide and hydrogen sulfide. Gas hydrate formation is ubiquitous in offshore drilling for and transportation of resources such as gas and/or crude oil, because subsea temperature and pressure conditions are favorable for or conducive to hydrate formation. In certain environments, the temperature is at or below about 35° F. Thus, wellheads, drilling and production annuli or control lines may become plugged or blocked with an accumulation of gas hydrate. Consequently, drilling fluids may lose their functionality, because hydrate formation may lead to an imbalance in composition of the fluid (less water than originally formulated), increased loss of circulation due to the changes in fluid properties, increased flow back, sudden exposure of the fluids at well surface conditions, which may lead to implosions, and great concern in flow-assurance, as well as real potential of abandoning a well or halting an operation operation are problems familiar to those knowledgeable in the art.

In prior art, gas hydrate is prevented or managed by a number of different methods. One method involves the use of salts and alcohols (glycols, methanol, etc.) (see, e.g., Sloan, E. D. et. al., JPT, December 2009; pp 89-94) to lower a freezing point temperature of the fluid. Other methods involve using low doses of hydrate inhibitors capable of altering hydrate formation kinetics (delaying the rate of hydrate formation) or capable of reducing or preventing hydrate precipitation by keeping hydrate in solution, so-called anti-agglomerants (see, e.g., Proceedings of the 6th ICGH 2008, Vancouver, BC, CA, Jul. 6-10, 2008). Other methods involve managing hydrate agglomeration mechanically by shearing (see, e.g., U.S. Pat. No. 6,774,276; Published International Application No. WO/2007/095399 & United States Published Application 2004/0129609). Other methods involve insulating and heating pipelines to reduce hydrate formation (see, e.g., U.S. Pat. No. 6,070,417). Another method uses high cost organic brines that have a low pour point temperature to reduce or inhibit hydrate formation such as formate brines.

While there are many different methods to address hydrate formation, there is still a need in the art for fluids that reduced or inhibit hydrate formation under conditions conducive to hydrate formation in the absence to the fluids and that are environmentally benign and less costly than fluids known to reduce or inhibit hydrate formation such as expensive formate brines.

SUMMARY OF THE INVENTION

Embodiments of the present invention provide methods for inhibiting hydrate formation, where the methods include using a phosphate brine and/or a nitrate brine as a base fluid in downhole operations under conditions conducive for hydrate formation. In certain embodiments, a fluid including a phosphate brine and/or a nitrate brine may also include capable anti-corrosion additives and/or neutralization additives. The fluid will also include other components depending on the application to which the fluids are being applied. For example, in the case of drilling fluids, the fluids may include capable drilling additives such as foaming agents for under-balanced or pressure managed drilling.

BRIEF DESCRIPTION OF THE DRAWINGS

The invention can be better understood with reference to the following detailed description together with the appended illustrative drawings in which like elements are numbered the same.

DEFINITIONS OF THE INVENTION

Figure 1:
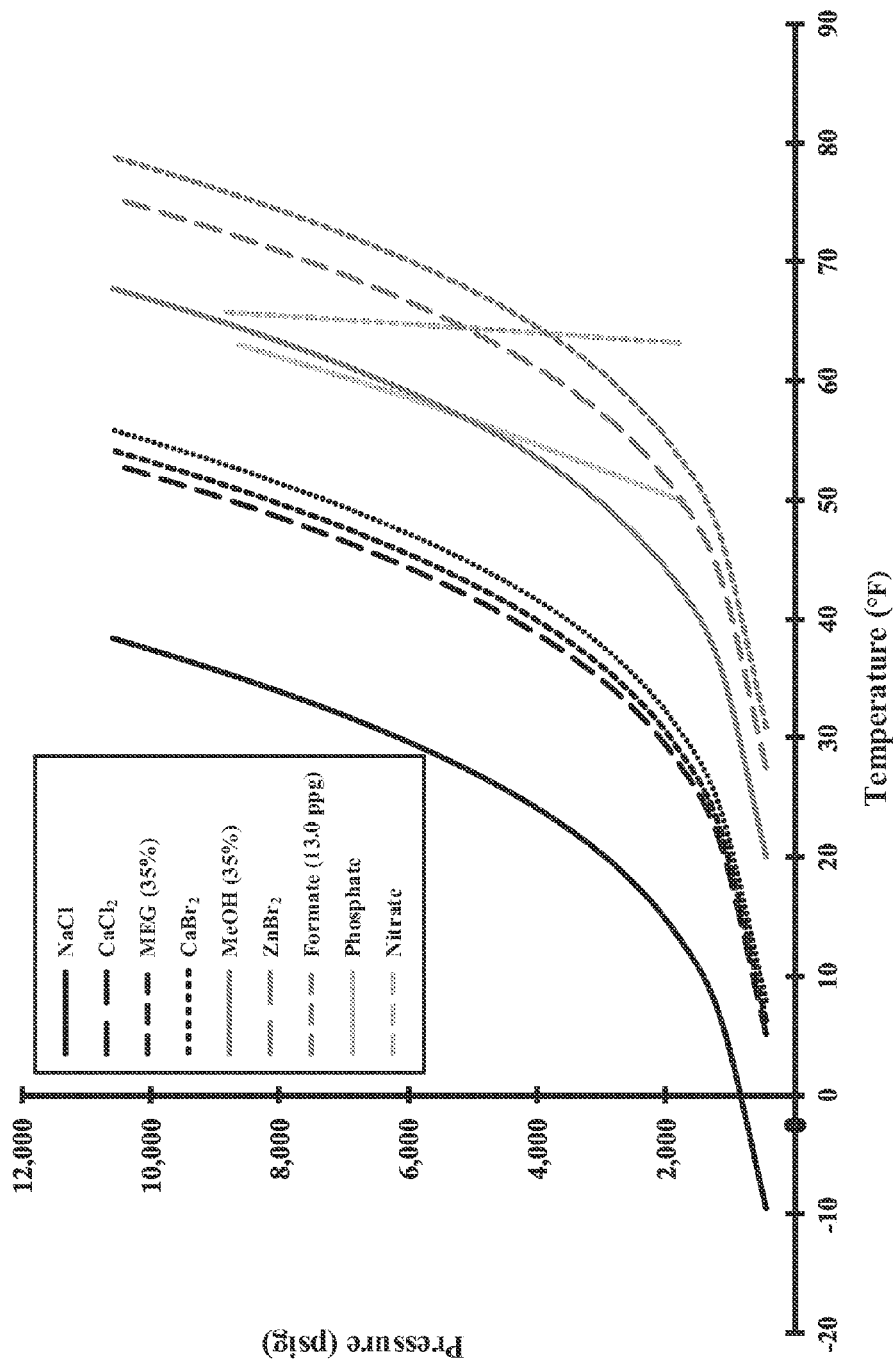
FIG. 1 depicts a plot of hydrate equilibrium curves showing a phosphate brine and a nitrate brine compared to conventional brines.

The term "substantially" means that the value or effect is at least 80% of being complete. In certain embodiments, the term means that the value of effect is at least 85% of being complete. In certain embodiments, the term means that the value of effect is at least 90% of being complete. In certain embodiments, the term means that the value of effect is at least 95% of being complete. In certain embodiments, the term means that the value of effect is at least 99% of being complete.

The term "about" means that the value or effect is at least 90% of being complete. In certain embodiments, the term means that the value of effect is at least 95% of being complete. In certain embodiments, the term means that the value of effect is at least 99% of being complete.

The term "ppg" means pounds per gallon (lb/gal) and is a measure of density.

The term "SG" means specific gravity.

The term "under-balanced and/or managed pressure drilling fluid" means a drilling fluid having a hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additive many include a corrosion inhibitor, a pH modifier and a shale inhibitor.

DETAILED DESCRIPTION OF THE INVENTION

The inventors have found that gas hydrate inhibiting fluids can be formulated to reduce or inhibit hydrate formation under conditions conducive for hydrate formation, where the fluids include an effective amount of a phosphate and/or nitrate brine. The brine reduces or inhibits hydrates formation. A small concentration of a composition of this invention introduced into a brine fluid changes a freezing point temperature of the brine fluid eliminating the formation of hydrates. The fluids may be foamed or unfoamed. For foamed fluid, an effective amount of a foaming system and a gas is added to the fluid to form a foam having desired properties.

Current teaching provides a novel non-halide brines designed to lower a pour point temperature of a fluid rending the fluid unsusceptible to hydrate formation. In addition, brine-compatible corrosion inhibiting additives may be used when needed. Instead of contending with highly expensive formate (sodium, potassium or cesium) brines, sodium, potassium, calcium or zinc (or their blends) phosphate brines or nitrate brines maybe used. As such, activity of using the brine sources or systems has no significant impact on the environment, because the brines are easy to handle and maybe disposed indiscriminately. Unlike when alcohols, amphipathics or oleophilic inhibitors are employed, brine-produced fluid separation is facile.

Suitable Reagents

Phosphate Brines

Suitable phosphate brines for use in the present invention include, without limitation, phosphoric acid brines, polyphosphoric acid brines, alkali metal brines, alkaline earth metal phosphate brines, transition metal phosphate brines, and mixtures or combinations thereof. Exemplary examples alkali metal phosphate brines include mono lithium hydrogen phosphate brines, mono hydrogen phosphate brines, mono potassium hydrogen phosphate brines, mono rubidium hydrogen phosphate brines, mono cesium hydrogen phosphate brines, di-lithium hydrogen phosphate brines, di-hydrogen phosphate brines, di-potassium hydrogen phosphate brines, di-rubidium hydrogen phosphate brines, di-cesium hydrogen phosphate brines, and mixture or combinations thereof. Exemplary examples of alkaline earth metal phosphate brines include magnesium phosphate brines, calcium hydrogen phosphate brines, and mixture or combinations thereof. Exemplary examples of transition metal phosphate brines include zinc phosphate brines, and mixture or combinations thereof.

It should be recognized that if one wants to form a mixed phosphate brine, then one would use a suitable hydrogen phosphate and a suitable base. For example, if one wanted to prepare a potassium-cesium mixed phosphate brine, then one could start with a potassium hydrogen phosphate and cesium hydroxide or cesium hydrogen phosphate and potassium hydroxide. One can also start with cesium, potassium hydrogen phosphate and neutralize with either potassium or cesium hydroxide depending on the brine to be produced. It should also be recognized that the phosphate brines can include more than two metals as counterions by using a mixture of hydrogen phosphates and/or a mixture of bases.

Nitrate Brines

Suitable nitrate brines useful in the present invention include, without limitation, alkali metal nitrate brines, alkaline earth metal nitrate brines, transition metal nitrate brines, and mixtures or combinations thereof. Exemplary examples of alkali metal nitrate brines include lithium nitrate, sodium nitrate, potassium nitrate, rubidium nitrate, cesium nitrate, and mixture or combinations thereof. Exemplary examples of alkaline earth metal nitrate brines include magnesium nitrates, calcium nitrates, and mixture or combinations thereof. Exemplary examples of transition metal nitrate brines include zinc nitrate brines, and mixture or combinations thereof.

Brine Specific Corrosion Inhibitors

Suitable neutralizing agents for neutralizing phosphate brines include, without limitation, acids, anhydrides, other compounds capable of neutralizing basic phosphate brines, or mixtures or combinations thereof. Suitable acids include, without limitation, organic acids, organic acid anhydrides, inorganic acids, inorganic acid anhydrides or mixtures and combinations thereof. Exemplary acids include, without limitations, carboxylic acids (mono, di or poly), halogen containing acids such as hydrochloric acid (HCl), hydrobromic acid (HBr), etc., sulfur containing acids such as sulfuric acid, sulfonic acids, sulfinyl acids, etc., phosphoric containing acids such as phosphoric acid, polyphosphoric acid, etc. or mixtures and combinations thereof. Exemplary carboxylic acids include, without limitation, saturated carboxy acids having from 1 to about 20 carbon atoms, unsaturated carboxy acids having from about 2 to about 20 carbon atoms, aromatic acids having from about 5 to about 30 carbon atoms, saturated dicarboxy acids having from 1 to about 20 carbon atoms, unsaturated dicarboxy acids having from about 2 to about 20 carbon atoms, aromatic diacids having from about 5 to about 30 carbon atoms, saturated polycarboxy acids having from 1 to about 20 carbon atoms, unsaturated polycarboxy acids having from about 2 to about 20 carbon atoms, aromatic polyacids having from about 5 to about 30 carbon atoms, or mixtures and combinations thereof. Exemplary sulfonic acids include, without limitation, alkyl sulfonic acids, alkenyl sulfonic acids, aryl sulfonic acids, where the alkyl groups include 1 to about 20 carbon atoms, the alkenyl groups include 2 to about 20 carbon atoms and the aryl groups include 5 to about 30 carbon atoms. In all of these structures, one or more of the carbon atoms may be replaced by hetero atoms including boron, nitrogen, oxygen, sulfur, or mixtures thereof and one or more of the required hydrogen atoms to complete the valency may be replaced by a halogen including fluorine, chlorine, or bromine, a hydroxyl group, an ether group, an amine, an amide, or mixtures thereof. Exemplary anhydrides include, without limitation, anhydrides prepared from one or more of the acids listed above. In certain embodiments, the acids include methane sulfonic acid (Lutropur MSA—LMSA) from BASF Corp. USA, benzoic acid from Sigma-Aldrich Co. USA, hydrochloric acid, glycolic acid, formic acid, polyphosphoric acid, or mixtures and combinations thereof.

Suitable quaternary salts and amine for use in the additive systems as corrosion inhibitors of this invention include, without limitation, quaternary ammonium salts ($R^1R^2R^3R^4N^{+A-}$), quaternary phosphonium salts ($R^1R^2R^3R^4P^{+A-}$), amines ($R^1R^2R^3N$), phosphines ($R^1R^2R^3P$), and mixtures or combinations thereof, where the $R^1$, $R^2$, $R^3$ and $R^4$ are the same or different and are carbyl groups having between 1 and about 20 carbon atoms (saturated, unsaturated, cyclic, acyclic, aromatic, or mixed) and sufficient hydrogen atoms to satisfy the valence, where one or more carbon atoms may be replaced by a hetero atom or group selected from oxygen, sulfur, amido, boron, or mixtures thereof, and one or more of the hydrogen atoms can be replace by halogens, alkoxdies, or mixtures thereof and where $A^-$ is a counterion. Exemplary examples of counterions include hydroxide (OH—), halogens ($F^-$, $Cl^-$, $Br^-$, $I^-$) sulfate ($SO_4^{2-}$), nitrate ($NO_3^-$), other counterions or mixtures thereof. Exemplary examples of quaternary and amines include other additive such as CORSAF SF (CSF) available from Tetra Technologies, Inc. USA, OxBan HB™ (OBHB) available from Tetra Technologies, Inc. USA, CorrFoam™ 1 (CF-1) available from Weatherford International, USA, Tri-aminononane Crude (TAN) available from NOVA Molecular Technologies, Inc. USA and BARDAC® LF, a quaternary biocides, available from Lonza Inc. Allendale, NJ.

Suitable bases include, without limitation, alkali metal hydroxides, alkaline earth metal and mixtures or combinations thereof. Exemplary examples include lithium hydroxide, sodium hydroxide, potassium hydroxide, rubidium hydroxide, cesium hydroxide, magnesium hydroxide and mixtures or combinations thereof.

Suitable Drilling Fluid Components

Suitable aqueous base fluids includes, without limitation, seawater, freshwater, saline water or such makeup system containing up to about 30% crude oil.

Suitable foaming agents for use in this invention include, without limitation, any foaming agent suitable for foaming aqueous based drilling fluids. Exemplary examples of foaming agents include, without limitation KleanFoam™, DuraFoam™, FMA-100™, TransFoam™ (all available from Weatherford International) or mixture or combinations.

Suitable polymers for use in this invention include, without limitation, any polymer soluble in the aqueous base fluid. Exemplary polymers include, without limitation, a polymer comprising units of one or more (one, two, three, four, five, . . . , as many as desired) polymerizable salts of mono-olefins or di-olefins. Exemplary examples includes, without limitation, natural polymers (starch, hydroxymethyl cellulose, xanthan, guar, etc.) and derivates; co-polymerizable monomers such as acrylates (acrylic acid, methyl acrylate, ethyl acrylate, etc.), methacrylates (methacrylic acid, methyl methacrylate, ethyl methacrylate, etc), 2-acrylamindomethylpropane sulfonic acid, vinylacetate, acrylamide, or the like, provided of course that the resulting polymer is soluble in the water base fluid.

Gases

Suitable gases for foaming the foamable, ionically coupled gel composition include, without limitation, nitrogen, carbon dioxide, or any other gas suitable for use in formation fracturing, or mixtures or combinations thereof.

Other Types of Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., $Na^+$, $K^+$ or $NH_4^+$ salts of EDTA; Na, K or $NH_4^+$ salts of NTA; $Na^+$, $K^+$ or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; $Na^+$, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythritol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl(methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) deaeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus Nitrilotriacetamide available from Clearwater International, LLC of Houston, Tex.

EXPERIMENTS OF THE INVENTION

Introduction

In preparation for this hydrate dissociation evaluation, two brine solutions were submitted to Intertek Westport Technology Center, Houston, Tex. USA. Each fluid was then evaluated for hydrate dissociation temperatures at varying pressures using a synthetic gas supplied by Intertek Westport (Green Canyon Gas). These tests were performed in a high pressure Autoclave mixing cell.

Test Procedures

Approximately 175 mL of a test fluid were poured into an open Autoclave cell. The cell was sealed, evacuated, and purged using the test gas to remove the possibility of interference due to air contamination. The pressure was increased to test conditions. The fluid was then allowed to become gas saturate with mixing. Upon completion of the saturation process, the pressure was shut in and the cell temperature was reduced at approximately 10° F. per hour to minimum test conditions. The temperature was then maintained at minimum test conditions for an extended period of time to ensure a significant amount of hydrate formation had occurred. A temperature ramp is conducted back up to the initial starting temperature at approximately 6° F. per hour. Temperature and pressure data were collected using a data acquisition system.

Three dissociation points were measured on each sample using this procedure at varying pressures to define the hydrate equilibrium curves.

Table I list the composition of the test gas.

TABLE I

Test Gas Composition

| ID | Component | Mole % |
|---|---|---|
| $N_2$ | Nitrogen | 0.14 |
| $C_1$ | Methane | 87.48 |
| $C_2$ | Ethane | 7.58 |
| $C_3$ | Propane | 3.08 |
| $i\text{-}C_4$ | Isobutane | 0.51 |
| $n\text{-}C_4$ | N-Butane | 0.80 |
| $i\text{-}C_5$ | Isopentane | 0.20 |
| $C_5$ | Pentane | 0.20 |

Table II tabulates the hydrate equilibrium test results for a nitrate brine and a phosphate brine.

TABLE II

Hydrate Equilibrium Curve by High Pressure Autoclave Method

| Nitrate ($K_2NO_3$) Brine SG = 1.35 | | Phosphate ($K_2HPO_4$) Brine SG = 1.78 | |
|---|---|---|---|
| Temp (° F.) | Press (psig) | Temp (° F.) | Press (psig) |
| 63.1 | 8,612 | 65.8 | 8,824 |
| 57.8 | 5,534 | 64.7 | 5,740 |
| 49.9 | 1,728 | 63.2 | 1,810 |

Referring to FIG. 1, a plot of hydrate equilibrium curves for seven commercial hydrate inhibitors are shown along with the three point curves for a nitrate brine and a phosphate brine of this invention. The nitrate brine is a potassium nitrate ($KNO_3$) brine having an SG of 1.35. The phosphate brine is a dipotassium hydrogen phosphate ($K_2HPO_4$) brine having an SG of 1.78. The curves show that the nitrate and phosphate brines behave similar to zinc bromide, formate and sodium chloride brines as opposed to calcium chloride and calcium bromide brines and organic hydrate inhibitors monoethylene glycol (MEG) and methanol.

Figure 2:
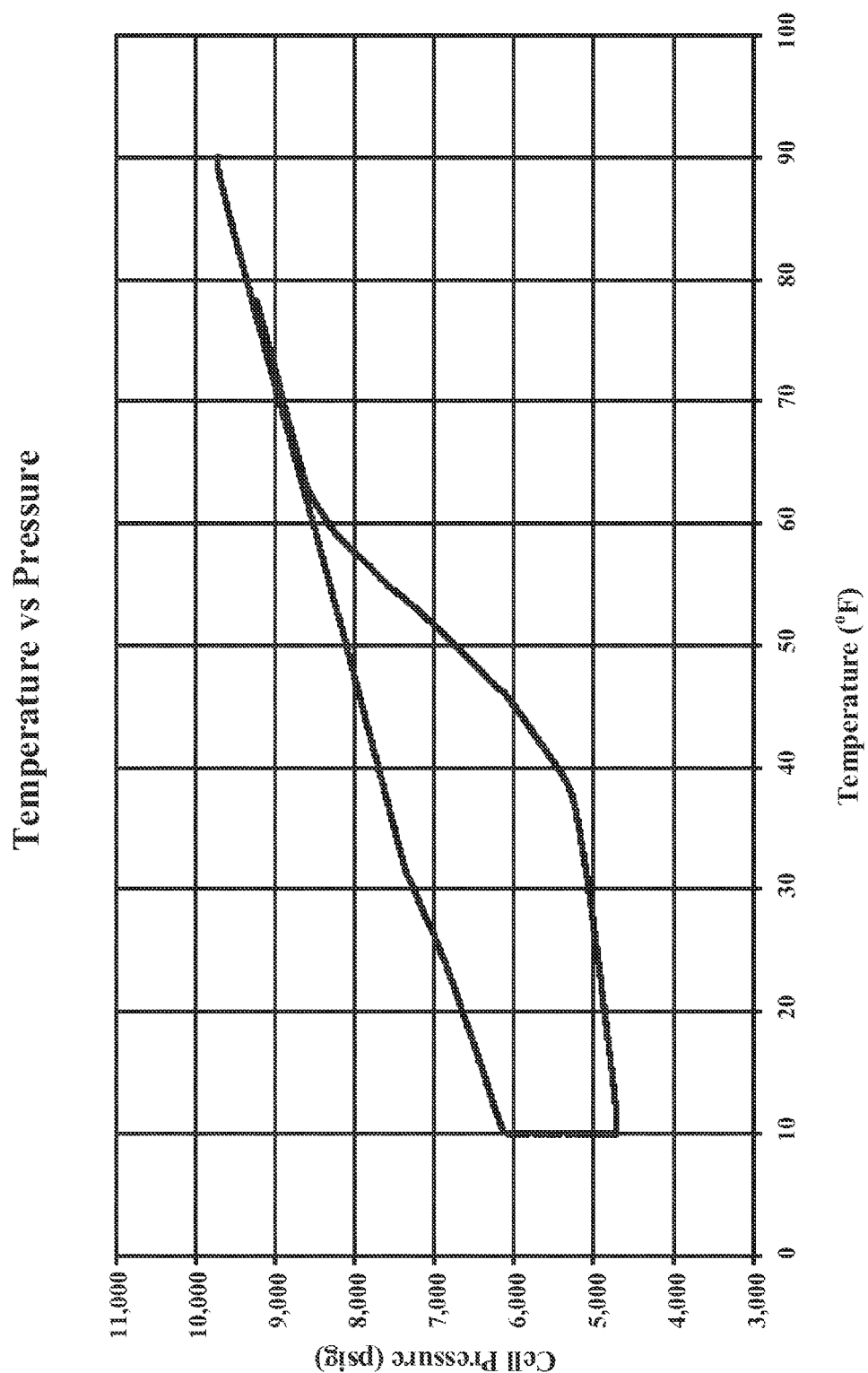
FIG. 2 depicts a hydrate dissociation point plot at the point 63.1° F. and 8,612 psig for a nitrate brine having a SG of 1.35.

Referring to FIG. 2, a plot of a hydrate dissociation point for the nitrate brine of this invention using the High Pressure Autoclave Method to determine hydrate equilibrium curve at 63.1° F. and 8,612 psig.

Figure 3:
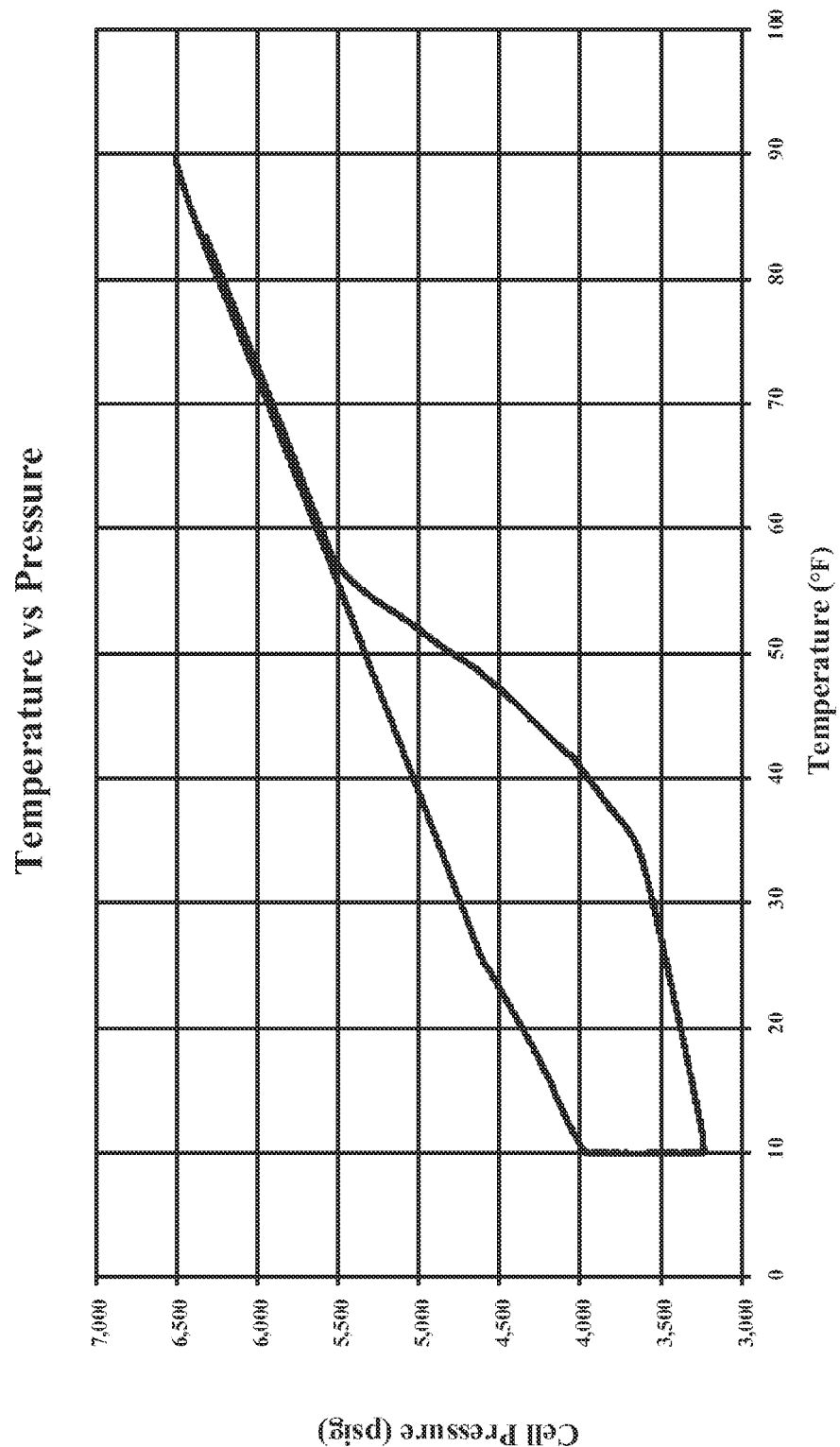
FIG. 3 depicts a hydrate dissociation point plot at the point 57.8° F. and 5,534 psig for a nitrate brine having a SG of 1.35.

Referring to FIG. 3, a plot of a hydrate dissociation point for the nitrate brine of this invention using the High Pressure Autoclave Method to determine hydrate equilibrium curve at 57.8° F. and 5,534 psig.

Figure 4:
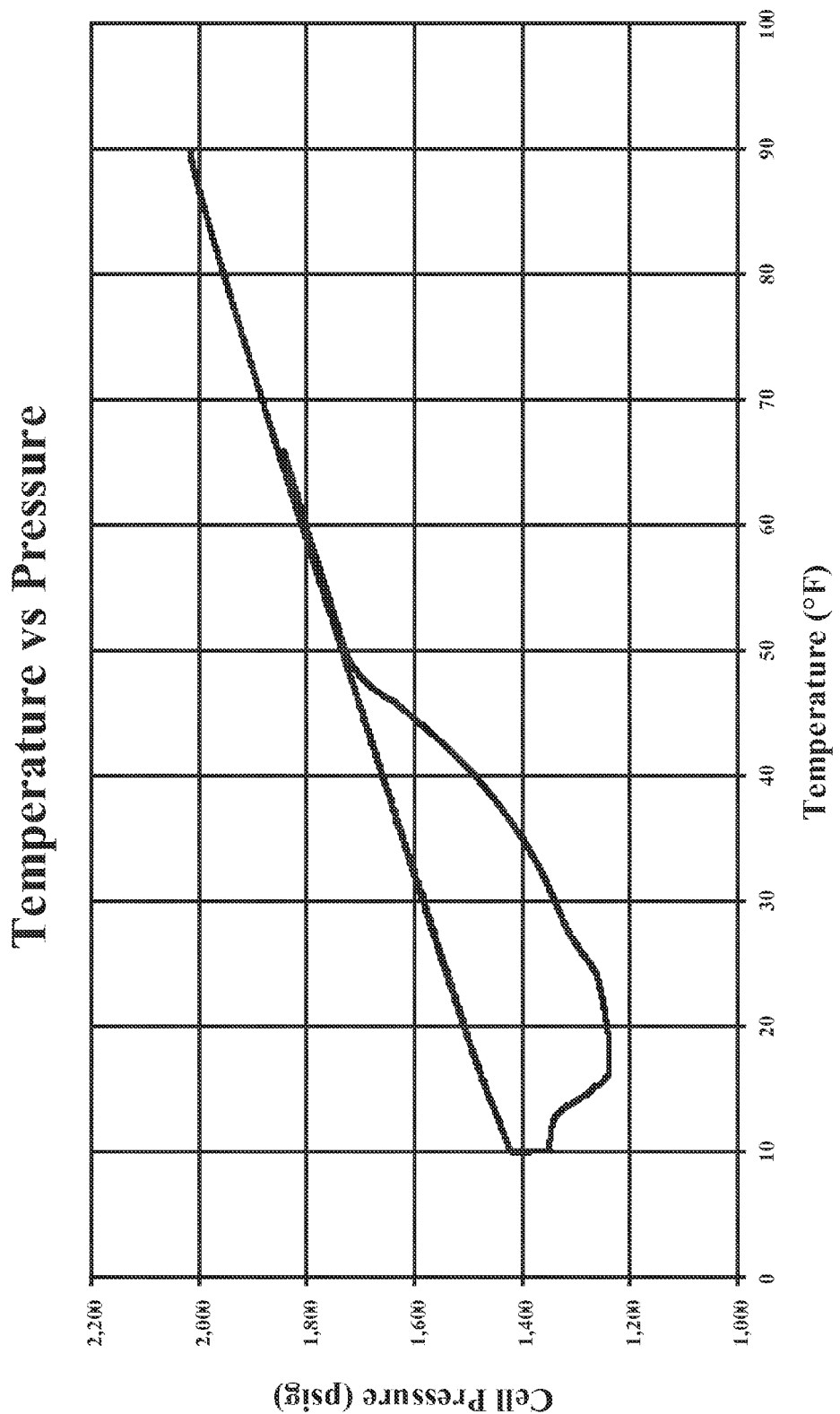
FIG. 4 depicts a hydrate dissociation point plot at the point 49.9° F. and 1,728 psig for a nitrate brine having a SG of 1.35.

Referring to FIG. 4, a plot of a hydrate dissociation point for the nitrate brine of this invention using the High Pressure Autoclave Method to determine hydrate equilibrium curve at 49.9° F. and 1,728 psig.

Figure 5:
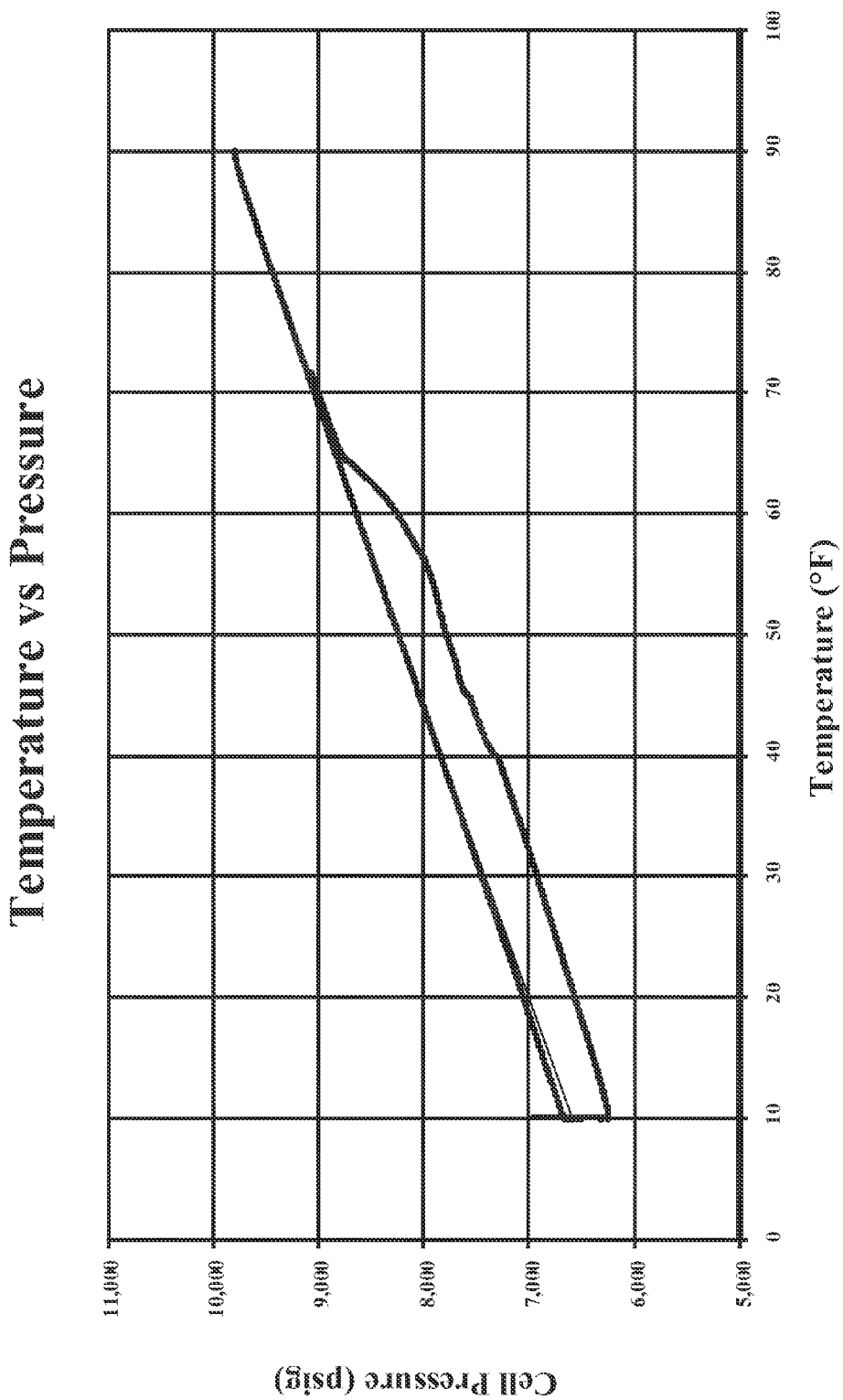
FIG. 5 depicts a hydrate dissociation point plot at the point 65.8° F. and 8,824 psig for a phosphate brine having a SG of 1.78.

Referring to FIG. 5, a plot of a hydrate dissociation point for the phosphate brine of this invention using the High Pressure Autoclave Method to determine hydrate equilibrium curve at 65.8° F. and 8,824 psig.

Figure 6:
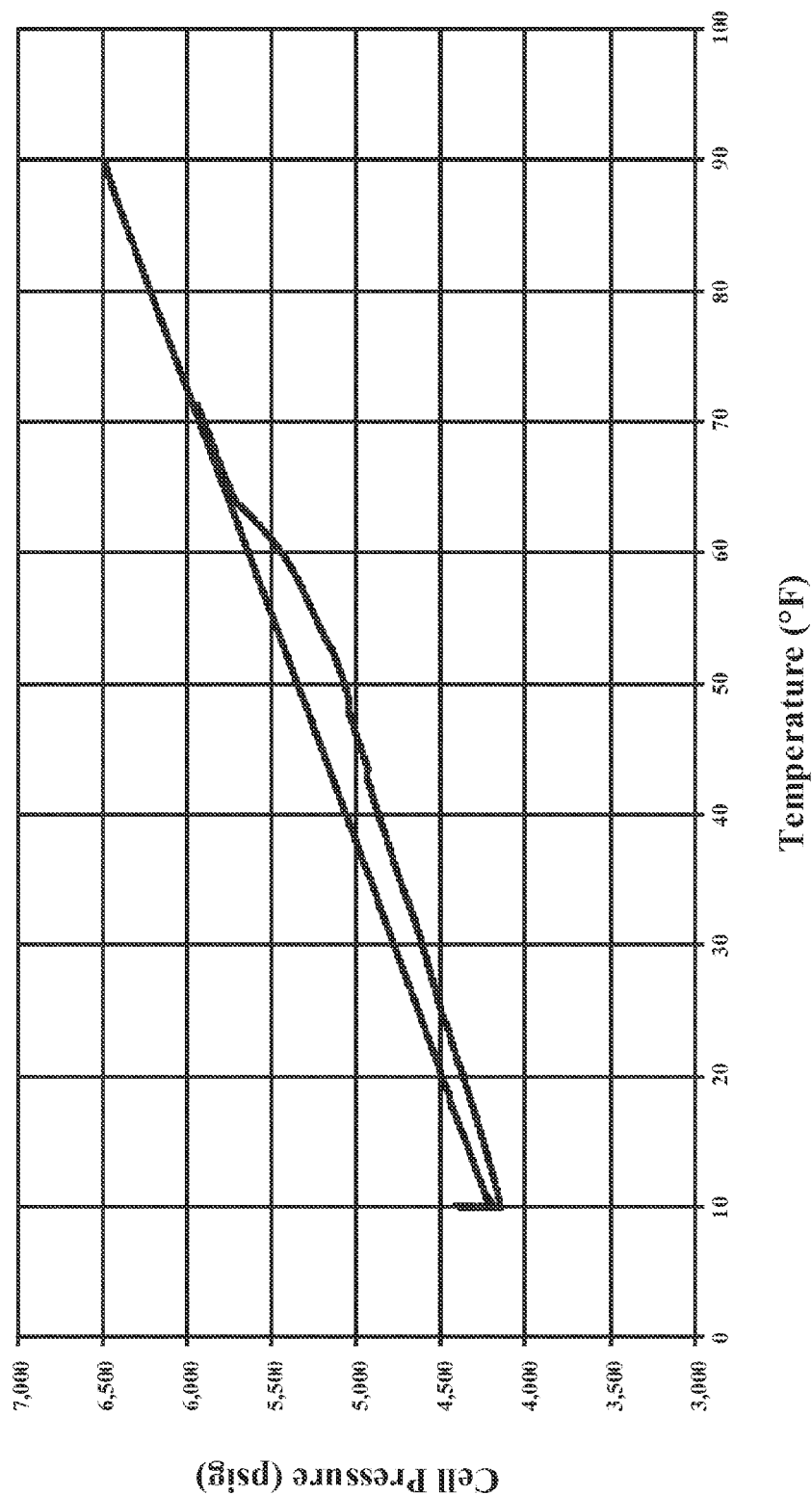
FIG. 6 depicts a hydrate dissociation point plot at the point 64.7° F. and 5,740 psig for a phosphate brine having a SG of 1.78.

Referring to FIG. 6, a plot of a hydrate dissociation point for the phosphate brine of this invention using the High Pressure Autoclave Method to determine hydrate equilibrium curve at 64.7° F. and 5,740 psig.

Figure 7:
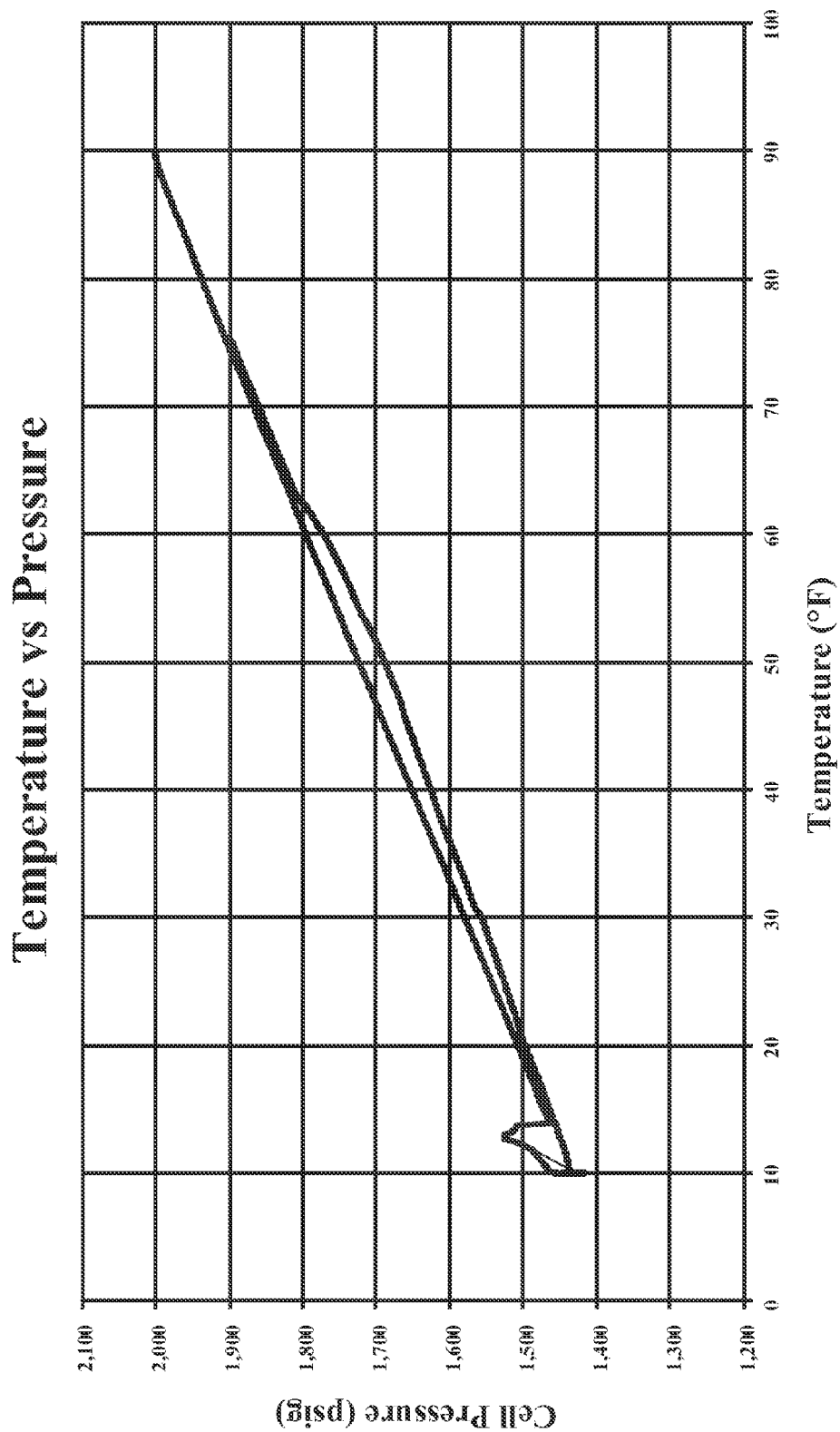
FIG. 7 depicts a hydrate dissociation point plot at the point 63.2° F. and 1,810 psig for a phosphate brine having a SG of 1.78.

Referring to FIG. 7, a plot of a hydrate dissociation point for the phosphate brine of this invention using the High Pressure Autoclave Method to determine hydrate equilibrium curve at 63.2° F. and 1,810 psig.

The data presented in the tables and figures clearly demonstrates that the phosphate and nitrate brines are ideal candidates for preparing fluid for use under condition conducive for hydrate formation. The phosphate and nitrate brines show hydrate equilibrium curves similar to zinc bromide, potassium formate and sodium chloride brines, which are currently used as hydrate inhibitors. The phosphate and nitrate brines are lower cost and are relatively non-corrosive. In certain embodiments, the brines may include compatible anti-corrosion additives and/or neutralization additives to further reduce any corrosive propensity of the brines. The phosphate and nitrate brines of this invention may be added to drilling fluids, foamed drilling fluids, completion fluids, foamed completion fluids, production fluid or foamed production fluids at concentration sufficient to reduce or inhibit hydrate formation. Additionally, the drilling, completion or production fluids, foamed or unfoamed, may use the phosphate and nitrate brines of this invention as the base fluid.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for inhibiting gas hydrate formation in downhole fluids comprising:
   using a downhole fluid including:
      a base fluid comprising a nitrate brine, and
      an inhibiting amount of a corrosion system including:
         at least one compatible anti-corrosion and/or neutralization additive is selected from the group consisting of mono carboxylic acids, dicarboxylic acids, poly carboxylic acids, hydrochloric acid (HCl), hydrobromic acid (HBr), sulfuric acid, sulfonic acids, sulfinyl acids, phosphoric acid, polyphosphoric acid, and mixtures or combinations thereof,
      where the downhole fluid is selected from the group consisting of a drilling fluid, a completion fluid, and a production fluid,
      where the base fluid reduces or inhibits hydrocarbon gas hydrate formation under conditions conducive to hydrocarbon gas hydrate formation in the downhole fluid, and
      where the additives reduce or prevent corrosion by the base fluid.

2. The method of claim 1, wherein the downhole fluid further include:
   an effective amount of a foaming system and a gas to form a foamed downhole fluid having desired foam properties.

3. The method of claim 1, wherein the nitrate brines are selected from the group consisting of alkali metal nitrate brines, alkaline earth metal nitrate brines, transition metal nitrate brines, and mixtures or combinations thereof.

4. The method of claim 3, wherein:
   the alkali metal nitrate brines are selected from the group consisting of lithium nitrate brines, sodium nitrate brines, potassium nitrate brines, rubidium nitrate brines, cesium nitrate brines, and mixture or combinations thereof,
   the alkaline earth metal nitrate brines are selected from the group consisting of magnesium nitrate brines, calcium nitrate brines, and mixture or combinations thereof, and
   the transition metal nitrate brines are zinc nitrate brines.

5. The method of claim 4, wherein:
the mono-, di- and polycarboxylic acids are selected from the group consisting of saturated carboxy acids having from 1 to about 20 carbon atoms, unsaturated carboxy acids having from about 2 to about 20 carbon atoms, aromatic acids having from about 5 to about 30 carbon atoms, saturated dicarboxy acids having from 1 to about 20 carbon atoms, unsaturated dicarboxy acids having from about 2 to about 20 carbon atoms, aromatic diacids having from about 5 to about 30 carbon atoms, saturated polycarboxy acids having from 1 to about 20 carbon atoms, unsaturated polycarboxy acids having from about 2 to about 20 carbon atoms, aromatic polyacids having from about 5 to about 30 carbon atoms, or mixtures and combinations thereof, and
the sulfonic acids include, without limitation, alkyl sulfonic acids, alkenyl sulfonic acids, aryl sulfonic acids, where the alkyl groups include 1 to about 20 carbon atoms, the alkenyl groups include 2 to about 20 carbon atoms and the aryl groups include 5 to about 30 carbon atoms.

6. A method for inhibiting gas hydrate formation in drilling fluids comprising:
using a drilling fluid including:
a base fluid comprising a nitrate brine, and
an inhibiting amount of a corrosion system including:
at least one compatible anti-corrosion and/or neutralization additive is selected from the group consisting of mono carboxylic acids, dicarboxylic acids, poly carboxylic acids, hydrochloric acid (HCl), hydrobromic acid (HBr), sulfuric acid, sulfonic acids, sulfinyl acids, phosphoric acid, polyphosphoric acid, and mixtures or combinations thereof,
where the nitrate brines are selected from the group consisting of alkali metal nitrate brines, alkaline earth metal nitrate brines, transition metal nitrate brines, and mixtures or combinations thereof,
where the base fluid reduces or inhibits hydrocarbon gas hydrate formation under conditions conducive to hydrocarbon gas hydrate formation in the base fluid, and
where the additives reduce or prevent corrosion by the base fluid.

7. The method of claim 6, wherein the drilling fluid further include:
an effective amount of a foaming system and a gas to form a foamed drilling fluid having desired foam properties.

8. The method of claim 6, wherein the nitrate brines are selected from the group consisting of alkali metal nitrate brines, alkaline earth metal nitrate brines, transition metal nitrate brines, and mixtures or combinations thereof.

9. The method of claim 8, wherein:
the alkali metal nitrate brines are selected from the group consisting of lithium nitrate brines, sodium nitrate brines, potassium nitrate brines, rubidium nitrate brines, cesium nitrate brines, and mixture or combinations thereof,
the alkaline earth metal nitrate brines are selected from the group consisting of magnesium nitrate brines, calcium nitrate brines, and mixture or combinations thereof, and
the transition metal nitrate brines are zinc nitrate brines.

10. The method of claim 9, wherein:
the mono-, di- and polycarboxylic acids are selected from the group consisting of saturated carboxy acids having from 1 to about 20 carbon atoms, unsaturated carboxy acids having from about 2 to about 20 carbon atoms, aromatic acids having from about 5 to about 30 carbon atoms, saturated dicarboxy acids having from 1 to about 20 carbon atoms, unsaturated dicarboxy acids having from about 2 to about 20 carbon atoms, aromatic diacids having from about 5 to about 30 carbon atoms, saturated polycarboxy acids having from 1 to about 20 carbon atoms, unsaturated polycarboxy acids having from about 2 to about 20 carbon atoms, aromatic polyacids having from about 5 to about 30 carbon atoms, or mixtures and combinations thereof, and
the sulfonic acids include, without limitation, alkyl sulfonic acids, alkenyl sulfonic acids, aryl sulfonic acids, where the alkyl groups include 1 to about 20 carbon atoms, the alkenyl groups include 2 to about 20 carbon atoms and the aryl groups include 5 to about 30 carbon atoms.

11. A method for inhibiting gas hydrate formation in completion fluids comprising:
using a drilling fluid including:
a base fluid comprising a nitrate brine, and
an inhibiting amount of a corrosion system including:
at least one compatible anti-corrosion and/or neutralization additive is selected from the group consisting of mono carboxylic acids, dicarboxylic acids, poly carboxylic acids, hydrochloric acid (HCl), hydrobromic acid (HBr), sulfuric acid, sulfonic acids, sulfinyl acids, phosphoric acid, polyphosphoric acid, and mixtures or combinations thereof,
where the nitrate brines are selected from the group consisting of alkali metal nitrate brines, alkaline earth metal nitrate brines, transition metal nitrate brines, and mixtures or combinations thereof,
where the base fluid reduces or inhibits hydrocarbon gas hydrate formation under conditions conducive to hydrocarbon gas hydrate formation in the completion fluid, and
where the additives reduce or prevent corrosion by the base fluid.

12. The method of claim 11, wherein the completion fluid further include:
an effective amount of a foaming system and a gas to form a foamed completion fluid having desired foam properties.

13. The method of claim 11, wherein the nitrate brines are selected from the group consisting of alkali metal nitrate brines, alkaline earth metal nitrate brines, transition metal nitrate brines, and mixtures or combinations thereof.

14. The method of claim 13, wherein:
the alkali metal nitrate brines are selected from the group consisting of lithium nitrate brines, sodium nitrate brines, potassium nitrate brines, rubidium nitrate brines, cesium nitrate brines, and mixture or combinations thereof,
the alkaline earth metal nitrate brines are selected from the group consisting of magnesium nitrate brines, calcium nitrate brines, and mixture or combinations thereof, and
the transition metal nitrate brines are zinc nitrate brines.

15. The method of claim 14, wherein:
the mono-, di- and polycarboxylic acids are selected from the group consisting of saturated carboxy acids having from 1 to about 20 carbon atoms, unsaturated carboxy acids having from about 2 to about 20 carbon atoms, aromatic acids having from about 5 to about 30 carbon atoms, saturated dicarboxy acids having from 1 to about 20 carbon atoms, unsaturated dicarboxy acids having from about 2 to about 20 carbon atoms, aromatic diacids having from about 5 to about 30 carbon atoms, saturated polycarboxy acids having from 1 to about 20 carbon atoms, unsaturated polycarboxy acids having from about 2 to about 20 carbon atoms, aromatic polyacids having from about 5 to about 30 carbon atoms, or mixtures and combinations thereof, and the sulfonic acids include, without limitation, alkyl sulfonic acids, alkenyl sulfonic acids, aryl sulfonic acids, where the alkyl groups include 1 to about 20 carbon atoms, the alkenyl groups include 2 to about 20 carbon atoms and the aryl groups include 5 to about 30 carbon atoms.

16. A method for inhibiting gas hydrate formation in production fluids comprising:
   using a production fluid including:
      a base fluid comprising a nitrate brine, and
      an inhibiting amount of a corrosion system including:
         at least one compatible anti-corrosion and/or neutralization additive is selected from the group consisting of mono carboxylic acids, dicarboxylic acids, poly carboxylic acids, hydrochloric acid (HCl), hydrobromic acid (HBr), sulfuric acid, sulfonic acids, sulfinyl acids, phosphoric acid, polyphosphoric acid, and mixtures or combinations thereof,
      where the nitrate brines are selected from the group consisting of alkali metal nitrate brines, alkaline earth metal nitrate brines, transition metal nitrate brines, and mixtures or combinations thereof,
      where the base fluid reduces or inhibits hydrocarbon gas hydrate formation under conditions conducive to hydrocarbon gas hydrate formation in the production fluid, and
      where the additives reduce or prevent corrosion by the base fluid.

17. The method of claim 16, wherein the production fluid further include:
   an effective amount of a foaming system and a gas to form a foamed production fluid having desired foam properties.

18. The method of claim 16, wherein the nitrate brines are selected from the group consisting of alkali metal nitrate brines, alkaline earth metal nitrate brines, transition metal nitrate brines, and mixtures or combinations thereof.

19. The method of claim 18, wherein:
   the alkali metal nitrate brines are selected from the group consisting of lithium nitrate brines, sodium nitrate brines, potassium nitrate brines, rubidium nitrate brines, cesium nitrate brines, and mixture or combinations thereof,
   the alkaline earth metal nitrate brines are selected from the group consisting of magnesium nitrate brines, calcium nitrate brines, and mixture or combinations thereof, and
   the transition metal nitrate brines are zinc nitrate brines.

20. The method of claim 19, wherein:
   the mono-, di- and polycarboxylic acids are selected from the group consisting of saturated carboxy acids having from 1 to about 20 carbon atoms, unsaturated carboxy acids having from about 2 to about 20 carbon atoms, aromatic acids having from about 5 to about 30 carbon atoms, saturated dicarboxy acids having from 1 to about 20 carbon atoms, unsaturated dicarboxy acids having from about 2 to about 20 carbon atoms, aromatic diacids having from about 5 to about 30 carbon atoms, saturated polycarboxy acids having from 1 to about 20 carbon atoms, unsaturated polycarboxy acids having from about 2 to about 20 carbon atoms, aromatic polyacids having from about 5 to about 30 carbon atoms, or mixtures and combinations thereof, and
   the sulfonic acids include, without limitation, alkyl sulfonic acids, alkenyl sulfonic acids, aryl sulfonic acids, where the alkyl groups include 1 to about 20 carbon atoms, the alkenyl groups include 2 to about 20 carbon atoms and the aryl groups include 5 to about 30 carbon atoms.

* * * * *